(12) United States Patent
Doudican et al.

(10) Patent No.: US 9,820,164 B1
(45) Date of Patent: Nov. 14, 2017

(54) SUBTERRANEAN SYSTEM COMPRISING WIRELESS COMMUNICATION NETWORK AND SYNTACTIC FOAM PANELS

(71) Applicant: Cornerstone Research Group, Inc., Dayton, OH (US)

(72) Inventors: Bradley M. Doudican, Dayton, OH (US); Patrick J. Hood, Bellbrook, OH (US)

(73) Assignee: CORNERSTONE RESEARCH GROUP, INC., Dayton, OH (US)

( * ) Notice: Subject to any disclaimer, the term of this patent is extended or adjusted under 35 U.S.C. 154(b) by 237 days.

(21) Appl. No.: 14/808,572

(22) Filed: Jul. 24, 2015

Related U.S. Application Data (60) Provisional application No. 62/029,110, filed on Jul. 25, 2014.

(51) Int. Cl.
| | | |
|---|---|---|
| *E21D 11/00* | (2006.01) | |
| *E21D 11/04* | (2006.01) | |
| *H04W 16/26* | (2009.01) | |
| *H04B 1/38* | (2015.01) | |
| *C09K 8/518* | (2006.01) | |
| *H04W 88/02* | (2009.01) | |

(52) U.S. Cl.
CPC ............ *H04W 16/26* (2013.01); *C09K 8/518* (2013.01); *H04B 1/38* (2013.01); *H04W 88/02* (2013.01)

(58) Field of Classification Search
CPC ....... E02D 11/00; E02D 11/003; E02D 11/04; C09K 8/00; C09K 8/518; H04W 16/00; H04W 16/24; H04W 16/26; H04W 88/00; H04W 88/02; H04B 1/38
USPC ..................... 405/132, 150.1, 151, 152, 153
See application file for complete search history.

(56) References Cited

U.S. PATENT DOCUMENTS

| | | | |
|---|---|---|---|
| 1,823,757 | A | 9/1931 | O'Rourke |
| 1,841,361 | A | 1/1932 | Bulkeley |
| 2,282,373 | A | 5/1942 | Minkler et al. |
| 4,495,986 | A | 1/1985 | Clark et al. |
| 5,277,036 | A | 1/1994 | Dieckmann et al. |
| 5,281,053 | A | 1/1994 | Matiere |
| 5,324,139 | A | 6/1994 | Wagner et al. |
| 6,195,561 | B1 | 2/2001 | Rose |
| 7,221,668 | B2 | 5/2007 | Twitchell, Jr. |

(Continued)

*Primary Examiner* — Benjamin Fiorello
*Assistant Examiner* — Stacy Warren
(74) *Attorney, Agent, or Firm* — Dinsmore & Shohl LLP (57) ABSTRACT

A subterranean system including a tunnel network, a plurality of syntactic foam panels, and a wireless communications network is disclosed. The wireless communications network comprises a plurality of wireless transceivers positioned throughout the tunnel network. The wireless communication range defined by communicatively coupled transceivers is a function of signal strength attenuation in a wireless signal traveling between the communicatively coupled transceivers. The tunnel network comprises tunnel support structure that contributes to the signal strength attenuation and a plurality of support apertures formed in the tunnel support structure. The syntactic foam panels are secured to the tunnel support structure to cover at least some of the support apertures and the composition and configuration of the syntactic foam panels are such that the panels do not make a significant contribution to the signal strength attenuation between communicatively coupled transceivers.

24 Claims, 3 Drawing Sheets

(56) References Cited

U.S. PATENT DOCUMENTS

| | | |
|---|---|---|
| 7,764,978 B1 | 7/2010 | West |
| 7,974,658 B2 | 7/2011 | Hunziker |
| 2005/0079818 A1* | 4/2005 | Atwater .................. H04B 5/06 |
| | | 455/41.2 |
| 2005/0281999 A1* | 12/2005 | Hofmann .................. B32B 5/18 |
| | | 428/304.4 |
| 2008/0229704 A1* | 9/2008 | Augustyniak ............. E04B 1/78 |
| | | 52/782.1 |
| 2009/0090236 A1* | 4/2009 | Misencik .................. E04H 9/10 |
| | | 89/36.02 |
| 2017/0211254 A1* | 7/2017 | Doudican ............... E02D 31/00 |

* cited by examiner

SUBTERRANEAN SYSTEM COMPRISING WIRELESS COMMUNICATION NETWORK AND SYNTACTIC FOAM PANELS

CROSS-REFERENCE TO RELATED APPLICATIONS

This application claims the benefit of U.S. Provisional Application Ser. No. 62/029,110 (CNE P108US00 MA), filed Jul. 25, 2014, and titled "Transportation System Comprising Wireless Communication Network and Syntactic Foam Panels" which is herein incorporated by reference in its entirety.

BACKGROUND

The present disclosure relates to subterranean systems and, more particularly, to subterranean systems comprising wireless networks.

BRIEF SUMMARY

The present applicant has recognized that subterranean systems comprising wireless networks often comprise tunnel network that comprise doorways, passageways, and other types of support apertures formed in the tunnel support structure. In many instances it may become desirable to obstruct, seal, or otherwise cover these apertures to address security concerns associated with these apertures. For example, an aperture in a tunnel wall could function as a convenient stowage for an explosive device. It can be problematic, however, to cover these apertures with conventional construction materials because doing so can lead to significant signal strength attenuation in the wireless network, particularly where the apertures themselves do not attenuate wireless signals. Accordingly, the present disclosure is directed at the use of syntactic foam panels in subterranean systems as a means of addressing the aforementioned security concerns and network configuration challenges associated with the aforementioned signal strength attenuation.

In accordance with one embodiment of the present disclosure, a subterranean system comprising a tunnel network, a plurality of syntactic foam panels, and a wireless communications network. The wireless communications network comprises a plurality of wireless transceivers positioned throughout the tunnel network. Respective ones of the wireless transceivers are communicatively coupled to one or more additional wireless transceivers of the wireless communications network such that communicatively coupled transceivers of the wireless communications network lie within wireless communication range of each other. The wireless communication range defined by communicatively coupled transceivers is a function of signal strength attenuation in a wireless signal traveling between the communicatively coupled transceivers. The tunnel network comprises tunnel support structure that contributes to the signal strength attenuation and a plurality of support apertures formed in the tunnel support structure. The syntactic foam panels are secured to the tunnel support structure to cover at least some of the support apertures and the composition and configuration of the syntactic foam panels are such that the panels do not make a significant contribution to the signal strength attenuation between communicatively coupled transceivers.

In accordance with one embodiment of the present disclosure a method of arranging a plurality of syntactic foam panels within a subterranean system comprising a tunnel network and a wireless communications network. The wireless communications network comprises a plurality of wireless transceivers positioned throughout the tunnel network. Respective ones of the wireless transceivers are communicatively coupled to one or more wireless transceivers of the wireless communications network such that communicatively coupled transceivers of the wireless communications network lie within wireless communication range of each other. The wireless communication range defined by communicatively coupled transceivers is a function of signal strength attenuation in a wireless signal traveling between communicatively coupled transceivers. The tunnel network comprises tunnel support structure that contributes to the signal strength attenuation and a plurality of support apertures formed in the tunnel support structure. The syntactic foam panels are arranged by securing the panels to the tunnel support structure to cover at least some of the support apertures and the composition and configuration of the syntactic foam panels are such that the panels do not make a significant contribution to the signal strength attenuation between communicatively coupled transceivers.

In accordance with one embodiment of the present disclosure, a subterranean system comprising a tunnel network, a plurality of syntactic foam panels, and a wireless communications network. The wireless communications network comprises a wireless frequency and a plurality of wireless transceivers positioned throughout the tunnel network. Respective ones of the wireless transceivers are communicatively coupled to one or more wireless transceivers of the wireless communications network such that communicatively coupled transceivers of the wireless communications network lie within wireless communication range of each other. The wireless communication range defined by communicatively coupled transceivers is a function of signal strength attenuation in a wireless signal traveling between communicatively coupled transceivers. The tunnel network comprises tunnel support structure that contributes to the signal strength attenuation and a plurality of support apertures formed in the tunnel support structure. The syntactic foam panels are secured to the tunnel support structure to cover at least some of the support apertures and the composition and configuration of the syntactic foam panels are such that signal strength attenuation contributed by individual ones of the syntactic foam panels is less than 0.5 dB at a wireless frequency between about 155 MHz and about 1300 MHz and less than 2.0 dB at the wireless frequency between about 900 MHz and about 2.4 GHz.

In accordance with one embodiment of the present disclosure, a subterranean system comprising a tunnel network, a plurality of syntactic foam panels, and a wireless communications network. The wireless communications network comprises a wireless frequency and a plurality of wireless transceivers positioned throughout the tunnel network. Respective ones of the wireless transceivers are communicatively coupled to one or more wireless transceivers of the wireless communications network such that communicatively coupled transceivers of the wireless communications network lie within wireless communication range of each other. The wireless communication range defined by communicatively coupled transceivers is a function of signal strength attenuation in a wireless signal traveling between communicatively coupled transceivers. The tunnel network comprises tunnel support structure that contributes to the signal strength attenuation and a plurality of support apertures formed in the tunnel support structure. The syntactic foam panels are secured to the tunnel support structure to cover at least some of the support apertures and the composition and configuration of the syntactic foam panels are such that signal strength attenuation contributed by individual ones of the syntactic foam panels is at least one order of magnitude less than that of the signal strength attenuation introduced by surrounding tunnel support structure to which the panel is secured at a wireless frequency between about 155 MHz and about 2.4 GHz.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
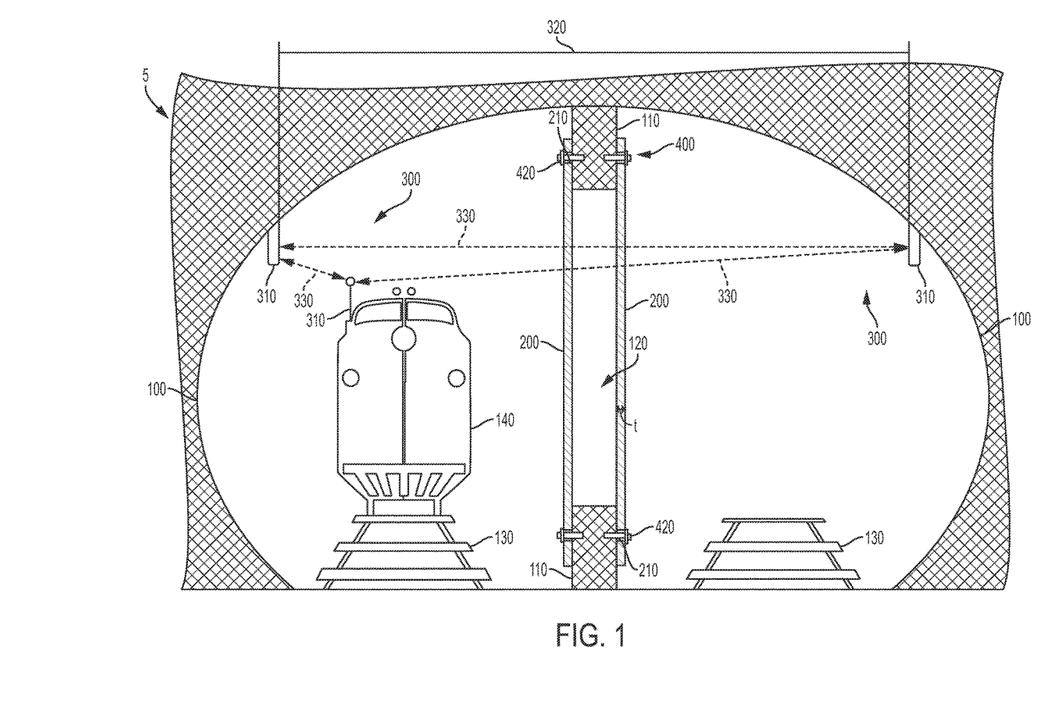
FIG. 1 depicts a subterranean transportation system according to one or more embodiments shown and described herein.

Referring initially to FIG. 1, a subterranean system 5 comprising a tunnel network 100, a plurality of syntactic foam panels 200, and a wireless communications network 300 is illustrated. The wireless communications network 300 comprises a plurality of wireless transceivers 310 positioned throughout the tunnel network 100. Respective ones of the wireless transceivers 310 are communicatively coupled to one or more additional wireless transceivers 310 of the wireless communications network 300 such that communicatively coupled wireless transceivers 310 of the wireless communications network 300 lie within wireless communication range 320 of each other. The wireless communication range 320 defined by communicatively coupled wireless transceivers 310 is a function of signal strength attenuation in a wireless signal 330 traveling between the communicatively coupled wireless transceivers 310. The details of wireless communication networks are beyond the scope of the present disclosure and may be gleaned from conventional and yet-to-be developed teachings in wireless literature—examples of which include U.S. Pat. Nos. 7,221,668, 7,974,658, and 7,764,978.

The tunnel network 100 comprises tunnel support structure 110 that contributes to the signal strength attenuation and a plurality of support apertures 120 formed in the tunnel support structure 110. Examples of support apertures 120 include, but are not to the following: utility apertures, maintenance access apertures, ventilation apertures, open space between the tunnel support structure 110, and the like. The syntactic foam panels 200 are secured to the tunnel support structure 110 to cover at least some of the support apertures 120 and the composition and configuration of the syntactic foam panels 200 are such that the syntactic foam panels 200 do not make a significant contribution to the signal strength attenuation between communicatively coupled wireless transceivers 310. As shown in FIG. 1, it is contemplated that the subterranean system 5 is a subterranean transportation system and the tunnel network 100 comprises one or more railroad tracks 130 for rail passenger transport vehicles 140.

A wireless signal 330 propagating between two wireless transceivers 310 will be subject to attenuation, which can be attributed to a variety of factors including the distance between individual wireless transceivers 310, the environment in which either or both wireless transceivers 310 are positioned, the properties of objects or barriers positioned between the wireless transceivers 310, etc. For the purposes of describing and defining the subject matter of the present disclosure, it is noted that a "significant contribution" to signal strength attenuation occurs when the signal strength between communicatively coupled wireless transceivers 310 is reduced to a degree that is sufficient to disrupt the primary functionality of the wireless communications network 300. For example, and not by way of limitation, if the signal strength of a received wireless signal 330 is below the operating parameters of the wireless communications network 300 or is otherwise not in accordance with the communication protocol of the wireless communications network 300, bit errors may occur when decoding the received wireless signal 330 such that information may be lost or a connection speed (e.g., bit rate) of the wireless communications network 300 may be degraded. In some cases, signal attenuation may be significant enough such that the wireless communications network 300 may lose connectivity, i.e., respective wireless transceivers 310 may no longer be communicatively coupled.

Because a wireless network size, complexity, and operating parameters may vary widely from one instance to the next, it is not appropriate to assign specific preferred attenuation values to the syntactic foam panels 200 contemplated by the present disclosure, particularly because particular communication systems will be able to tolerate more or less attenuation than others. Accordingly, the present disclosure has been deliberately fashioned to encourage those practicing the concepts introduced herein to compose and configure suitable syntactic foam panels 200 with the primary goal of ensuring that the syntactic foam panels 200 do not make a significant contribution to the signal strength attenuation between communicatively coupled wireless transceivers 310. For example, and not by way of limitation, it is contemplated that the composition and configuration of the syntactic foam panels 200 may be such that the syntactic foam panels 200 attenuate a wireless signal 330 in the range of about 155 MHz to about 1300 MHz by less than 0.5 dB or more particularly, by less than 0.38 dB. For wireless signals 330 between about 900 MHz and about 2.4 GHz, signal attenuation of less than about 2 dB or, more particularly, less than about 1.4 dB is contemplated. It is further contemplated that the composition and configuration of the syntactic foam panels 200 may be such that they attenuate a wireless signal about zero dB between about 155 MHz to about 2.4 GHz.

In many cases, it will be sufficient to ensure that the syntactic foam panels 200 are configured and composed such that the signal strength attenuation they introduce is at least one order of magnitude less than that of the signal strength attenuation introduced by the surrounding tunnel support structure 110 to which they are secured. In other cases, it will be sufficient to ensure that the syntactic foam panels 200 are configured and composed such that the signal attenuation they introduce does not require reconfiguration and/or relocation of the wireless transceivers 310 within the tunnel after installation of the syntactic foam panels 200. In still further cases, it will be sufficient to ensure that the syntactic foam panels 200 are configured and composed such that the signal attenuation they introduce is less than the signal attenuation that would be introduced by concrete panels between about 1 inch (2.54 cm) to about 4 inches (10.16 cm) thickness and ASTM A36 structural quality steel between about 3/16 inches (0.476 cm) and about 1½ inches (3.81 cm) thickness.

In one embodiment, the syntactic foam panels 200 may comprise microballoons in a resin matrix. The microballoons may comprise glass, polymer, ceramic, or combinations thereof, and the resin matrix comprises cyanate ester, silicone, epoxy, vinyl ester, polyester, polyurethane or combinations thereof. The resin matrix may comprise resin modifiers such as flame retardants, viscosity modifiers, fillers, or combinations thereof for example. The viscosity modifiers may comprise fumed silica and the resin modifiers may comprise carbon black. In one embodiment, the syntactic foam panel 200 may comprises about 12% to about 36% by weight microballoons and about 64% to about 88% by weight resin matrix. In one embodiment, the syntactic foam panel 200 may comprise about 12% to about 18% by weight microballoons and about 82% to about 88% by weight resin matrix.

The glass microballoons may have a density range from 0.10 g/cc to 0.85 g/cc, or from 0.10 to 0.63 g/cc, or from 0.125 g/cc to 0.46 g/cc. The density of the microballoons is determined by the ratio of the inner and outer radii of the microballoons or wall thickness of the microballoons. A thicker effective wall thickness of the microballoons results in a higher effective panel density of the syntactic foam panel. For the same kind of glass, microballoons with a thicker wall generally results in a higher crush strength. A thicker wall thickness will also result in syntactic foam panel 200 with a higher panel density. In general, a lower density of microballoons will make the syntactic foam panel 200 easier to handle as it's lighter in weight, that's especially true for larger panel. Conversely, a syntactic foam panel 200 made with higher density microballoons will potentially increase the compressive strength and flexural strength at the expense of the lighter weight benefit. In embodiments, the glass microballoons may have a crush strength of 250 to 28,000 psi, and more preferably have a crush strength of 250 psi to 16000 psi. It is contemplated that the syntactic foam panels 200 may have a panel density of about 0.4 g/cc to about 1.2 g/cc. More preferably, the syntactic foam panel 200 may have a panel density of about 0.5 g/cc to about 0.8 g/cc.

It is contemplated that the average diameter of the microballoons may range from 10 micron to 85 microns. More preferably, the average diameter of the microballoons may range from 20 to 85 microns, from 20 to 65 microns, or from 30 to 75 microns. The diameters of the microballoons determine the packing efficiency of the microballoons within the polymer matrix of the syntactic foam panel 200. With the use of smaller diameter microballoons at high loadings, the microballoons can be packed together with a lower void space between the microballoons. The resulting void space will be occupied by the polymer resin which has a higher density than the microballoon. Since microballoons in general have a lower density than the polymer resin, lighter weight syntactic foam panels 200 can be achieved with efficiently packed smaller diameter microballoons as the volume percentage of microballoons relative to resin increases. Additionally, a mixture of smaller diameter microballoons with larger diameter microballoons may be combined to achieve maximum packing efficiency of microballoons in the matrix by minimizing polymer resin loading.

A variety of factors, including the microballoon wall thickness, crush strength of the microballoons, loading of the microballoons, and viscosity of the uncured syntactic mixture should be considered when selecting the appropriate composition to achieve target performance requirements of the resulting syntactic foam panel 200.

In specific embodiments, the syntactic foam system may be able to support a structural load. The syntactic foam system may have a compressive strength of 1,000 to 20,000 psi, or about 3,000 to 15,000 psi. It is contemplated that incorporating high loading of glass microballoons with high crush strength into a thermosetting polymer matrix results in a near close-packed structure to effectively transfer the structural load between the high strength microballoons. The structural load transfer may be either through direct contacts between the microballoons, or through the polymer matrix.

The syntactic foam panel 200 may have a dielectric constant of about 1.5 to about 10, or about 2.0 to about 6.0 and an electrical conductivity of less than about $1\times10^{-13}$ S/m. It is contemplated that the dielectric constant and electrical conductivity of the syntactic foam panels 200 may vary depending on the composition and configuration of the syntactic foam panel 200 such as, for example, the proportion of resin to microballoons. A low dielectric constant in the range of about 1.5 to about 10 or about 2.0 to about 6.0 may result not significantly contribute to loss of signal strength for radio frequency (RF) transmission through the syntactic foam panel 200.

The syntactic foam panel 200 may have a tensile strength of about 1000 to about 8000 psi, or more preferably about 1000 to about 5000 psi. The tensile strength is dictated by the material properties of the polymer resin matrix and is specific to the selected polymer resin used. In order to achieve specific performance requirements, the appropriate polymer resin will be selected for incorporation of microballoons to form the syntactic foam panel 200.

Further, the syntactic foam panel 200 may have a flexural strength of about 1000 to about 8000 psi, or about 2000 to about 5000 psi. The flexural strength is a result of the combination of both the tensile properties and the compression properties of the syntactic foam panel 200. Thus, the tensile properties and the compression properties of the syntactic foam panel 200 are dependent on both the resin and the microballoon properties. In addition, they also depend on the packing efficiency of microballoons within the polymer matrix, since the packing efficiency of microballoons within the polymer matrix will also affect the compression properties of the structure.

It is contemplated that the composition of the syntactic foam panels 200 may be Advantic® syntactic foam panels, e.g., the Advantic 30D product produced by Cornerstone Research Group. It is contemplated that the syntactic foam panel 200 may comprise a coating that provides fire retardant characteristics or aesthetic functions such as color or desired texture. In one embodiment, a fire retardant coating is the FlameOff coating product produced by FlameOff Inc. In one embodiment, the syntactic foam panels 200 may manage these loads with strength ranges of about 1,500 psi to about 5,000 psi in tension, about 3,500 psi to about 16,000 psi in compression, and about 2,500 psi to about 7,000 psi in flexure.

In one embodiment, the syntactic foam panels 200 may satisfy some or all of the properties delineated in the following table:

| Property | Test Method | Criterion |
|---|---|---|
| Density | ASTM 03575 | 35 lbs./cu.ft. |
| Ultimate Compressive Strength | ASTM 0695 | 3900 psi |
| Compression elastic modulus | ASTM 0695 | 179.2 ksi |
| Ultimate Tensile strength | ASTM 0638 | 3000 psi |
| Thermal conductivity | ASTM 05930 | 0.049 BTU/hr ft F |
| Water Absorption | ASTM 0570 | <2% |
| Chemical Resistance (1 hr. exposure) | Various | Pass |
| Time to ignition | ASTM E1354-10 | >5 sec |
| Avr. Heat release @ 180 s | ASTM E1354-10 | <360 Kw/m2 |
| Heat of combustion | ASTM E1354-10 | <29 kJ/g |
| Smoke release rates | ASTM E1354-10 | <0.245 m2/sec |
| Critical Heat Flux for Ignition | ASTM E1354-10 | 18 kW/m2 |

It is contemplated that the syntactic foam panels 200 may have substantially uniform thickness such as the syntactic foam panel 200 shown in FIG. 1. In one embodiment, respective syntactic foam panels 200 may have a thickness of about 0.5 inches (1.27 cm) to about 6 inches (15.24 cm). In one embodiment, respective syntactic foam panels 200 may have a thickness of about 0.75 inches (1.905 cm) to about 2 inches (5.08 cm).

The syntactic foam panels 200 may be dimensionally configured such that they extend beyond the bounds of the support apertures 120 formed in the tunnel support structure 110. For example, if the support aperture 120 is substantially circular in shape, the syntactic foam panel 200 may be circular in shape and dimensioned such that the syntactic foam panel 200 extends beyond the bounds of the circular support aperture 120 to allow the coupling of the syntactic foam panel 200 to the tunnel support structure 110. In one embodiment, the syntactic foam panel 200 may comprise a substantially planar and substantially rectangular panel shape. For example, and not by way of limitation, a substantially rectangular panel shape may be used for support apertures 120 that are substantially rectangular, a non-rectangular shape, a sinuous shape, and the like. For the example shapes, the syntactic foam panel 200 may be substantially rectangular in shape and sized to extend beyond the bounds of the support aperture 120 to allow the coupling of the syntactic foam panel 200 to the tunnel support structure 110. For example, and not by way of limitation, the syntactic foam panel 200 may be configured with a width between about 48 inches (121.92 cm) to about 60 inches (152.4 cm), and a height of about 84 inches (213.36 cm) to about 180 inches (4.572 m). In one example, it is contemplated that the syntactic foam panel 200 may be configured with a thickness of about 1.25 inches (3.18 cm), a width of about 60 inches (152 cm), and a height of about 96 inches (244 cm).

Figure 2:
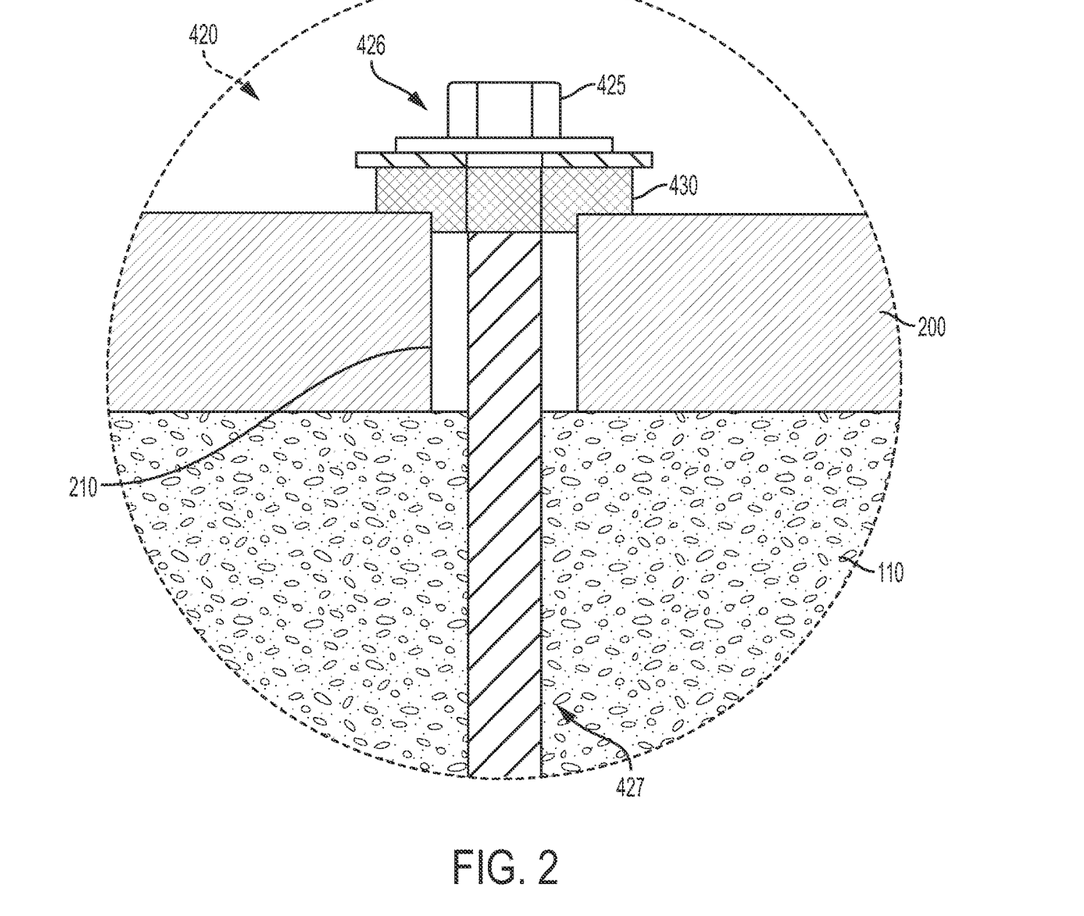
FIG. 2 is a cross-sectional view of a panel fastening system according to one or more embodiments shown and described herein.

A panel fastening system 400 secures the syntactic foam panels 200 to the tunnel support structure 110. The syntactic foam panel 200 comprises a pair of opposite major faces defining a panel thickness t and a plurality of mounting holes 210 on the periphery of the syntactic foam panel 200 and extending longitudinally across the panel thickness t between the opposite major faces of the syntactic foam panel 200.

The panel fastening system 400 comprises a plurality of bolt assemblies 420 as shown in FIG. 2. Selected ones of the bolt assemblies 420 may comprise an anchor bolt 425 and a compound elastomeric bushing 430. The anchor bolt 425 comprises a head portion 426 and a shaft portion 427. The shaft portion 427 of the anchor bolt 425 extends along a longitudinal dimension of the anchor bolt 425. The compound elastomeric bushing 430 comprises an axially compressible portion and a laterally compressible portion that collectively define an interior bushing passage extending along a longitudinal dimension of the compound elastomeric bushing 430. The interior bushing passage is sized to permit passage of the shaft portion 427 of the anchor bolt 425 therethrough while inhibiting passage of the head portion 426 of the anchor bolt 425 therethrough. A peripheral lateral dimension of the axially compressible portion of the compound elastomeric bushing 430 exceeds the peripheral lateral dimension of the selected mounting hole 210 of the syntactic foam panel 200 to inhibit passage of the axially compressible portion of the compound elastomeric bushing 430 through the selected mounting hole 210. A peripheral lateral dimension of the laterally compressible portion of the compound elastomeric bushing 430 is less than or substantially equal to the peripheral lateral dimension of the selected mounting hole 210 of the syntactic foam panel 200 to permit passage of the laterally compressible portion of the compound elastomeric bushing 430 into the selected mounting hole 210. A peripheral longitudinal dimension of the laterally compressible portion of the compound elastomeric bushing 430 is at least partially disposed along the peripheral longitudinal dimension of the selected mounting hole 210 of the syntactic foam panel 200. Further disclosure of the panel fastening system 400 may be found in U.S. application Ser. No. 14/643,508, referenced hereinbefore.

Figure 3:
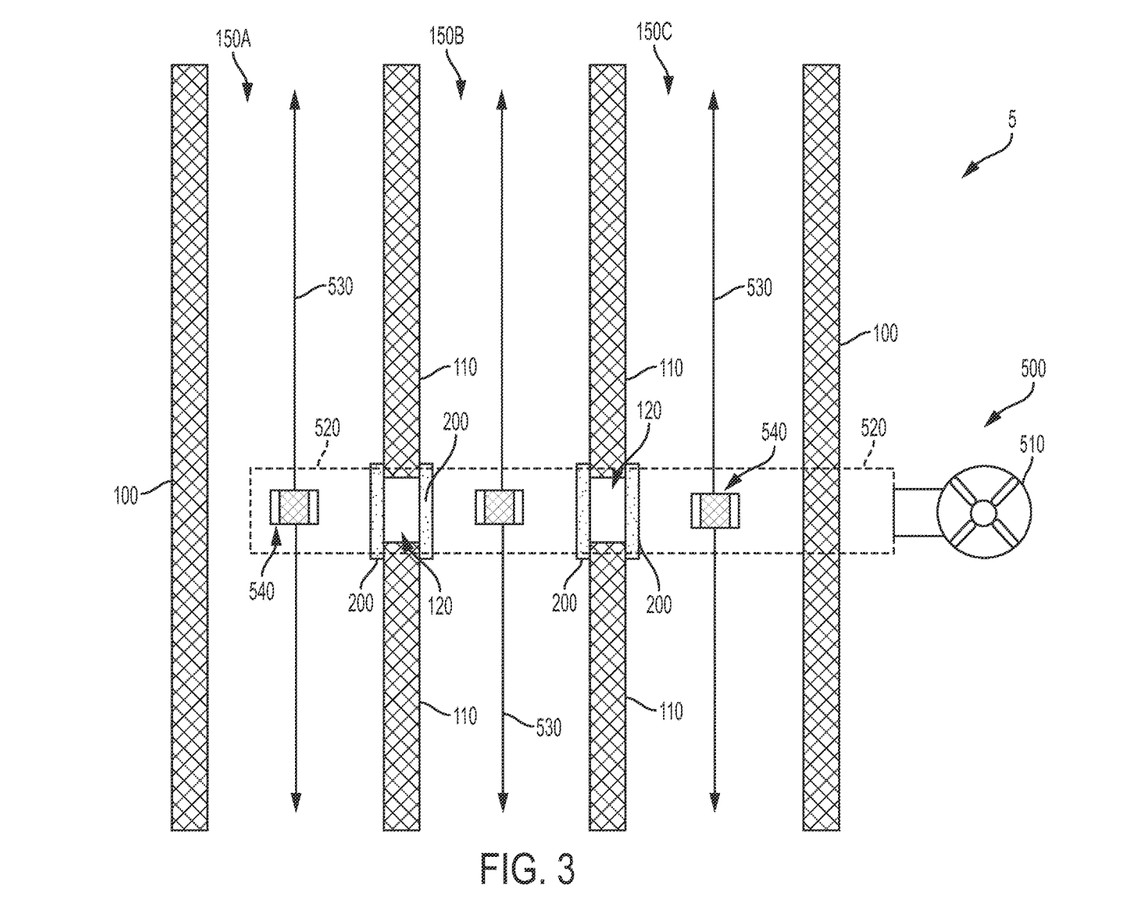
FIG. 3 is a plan view of a supplemental ventilation system according to one or more embodiments shown and described herein.

Referring now to FIG. 3, the subterranean system 5 may comprise a supplemental ventilation system 500. The composition and configuration of the syntactic foam panels 200 may be such that the syntactic foam panels 200 significantly degrade air circulation through the support apertures 120 of the tunnel support structure 110. In other words, the syntactic foam panels 200 may divide the tunnel network 100 into a plurality of adjacent tunnels (e.g., first tunnel 150A, second tunnel 150B, and third tunnel 150C). The supplemental ventilation system 500 may be configured to at least partially account for the degraded air circulation. Specifically, the supplemental ventilation system 500 may comprise a blower 510 and a duct system 520 to encourage air circulation 530 between the plurality of adjacent tunnels. The duct system 520 may comprise a plurality of vents 540 to distribute and direct the air. In one embodiment, respective syntactic foam panels 200 may be dimensioned to allow the duct system 520 to penetrate and atmospherically coupled the adjacent tunnels together. In one embodiment the supplemental ventilation system 500 may be a heating ventilation and air conditioning (HVAC) system. The HVAC system may comprise a return duct system (not shown) which aids in the circulation of air through the HVAC system to condition the air, the details of which are beyond the scope of the present disclosure and may be gleaned from conventional and yet-to-be developed teachings in the HVAC literature—examples of which include U.S. Pat. Nos. 1,841,361, 2,282,373, 4,495,986, and 5,277,036.

It is contemplated that addition of the syntactic foam panels 200 may create a barrier to the spread of fires, aid in exhausting fumes and chemical vapors, create visual barriers between pedestrian gathering areas, and the like. As discussed hereinbefore, the syntactic foam panel may have a fire retardant coating applied. In one embodiment, the supplemental ventilation system 500 may comprise a plurality of ventilation zones. Each ventilation zone may correspond to an adjacent tunnel 150A, 150B, or 150C such that any smoke, fumes, vapors, etc., may be exhausted from the tunnel network 100 without spreading the smoke, fumes, vapors, etc. to adjacent tunnels 150A, 150B, or 150C. It is contemplated that, although three adjacent tunnels 150A, 150B, and 150C, are shown in FIG. 3, any number of adjacent tunnels may be used in the tunnel network 100.

It is contemplated, in one embodiment, that the subterranean system 5 may be a mine and the tunnel network 100 comprises a plurality of horizontally and vertically distributed tunnel network levels. In one embodiment, the subterranean system 5 may be a subterranean transportation network the tunnel network 100 may comprise one or more roadways for passenger vehicles. In one embodiment, the subterranean system 5 may also be a subterranean pedestrian network and the tunnel network 100 comprises one or more pedestrian footpaths. The details of a subterranean transportation system, mine, or pedestrian footpath are beyond the scope of the present disclosure and may be gleaned from conventional and yet-to-be developed teachings in the subterranean literature—examples of which include U.S. Pat. Nos. 5,324,139, 5,281,053, 1,823,757, and 6,195,561. It is further contemplated that the various embodiments of the subterranean system 5 may be combined. For example, and not by way of limitation, a subterranean transportation system may include both roadways and pedestrian footpaths wherein the pedestrian footpaths are elevated walkways along the perimeter of the tunnel network 100.

For the purposes of describing and defining the present invention, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

It is also noted that recitations herein of "at least one" component, element, etc., should not be used to create an inference that the alternative use of the articles "a" or "an" should be limited to a single component, element, etc.

It is noted that recitations herein of a component of the present disclosure being "configured" in a particular way, to embody a particular property, or to function in a particular manner, are structural recitations, as opposed to recitations of intended use. More specifically, the references herein to the manner in which a component is "configured" denotes an existing physical condition of the component and, as such, is to be taken as a definite recitation of the structural characteristics of the component.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

For the purposes of describing and defining the present invention it is noted that the terms "substantially" and "about" are utilized herein to represent the inherent degree of uncertainty that may be attributed to any quantitative comparison, value, measurement, or other representation. The terms "substantially" and "about" are also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A subterranean system comprising: a tunnel network; a plurality of syntactic foam panels; and a wireless communications network; wherein
   the wireless communications network comprises a plurality of wireless transceivers positioned throughout the tunnel network,
   respective ones of the wireless transceivers are communicatively coupled to one or more additional wireless transceivers of the wireless communications network such that communicatively coupled transceivers of the wireless communications network lie within wireless communication range of each other,
   the wireless communication range defined by communicatively coupled transceivers is a function of signal strength attenuation in a wireless signal traveling between the communicatively coupled transceivers,
   the tunnel network comprises tunnel support structure that contributes to the signal strength attenuation and a plurality of support apertures formed in the tunnel support structure,
   the syntactic foam panels are secured to the tunnel support structure to cover at least some of the support apertures, and
   the composition and configuration of the syntactic foam panels are such that the panels do not make a significant contribution to the signal strength attenuation between communicatively coupled transceivers.

2. The system as claimed in claim 1 wherein the syntactic foam panels comprise microballoons in a resin matrix and the microballoons comprise glass, polymer, ceramic, or combinations thereof, and the resin matrix comprises cyanate ester, silicone, epoxy, vinyl ester, polyester, polyurethane or combinations thereof.

3. The system as claimed in claim 2 wherein the syntactic foam panel comprises about 12% to about 36% by weight microballoons and about 64% to about 88% by weight resin matrix.

4. The system as claimed in claim 2 wherein the syntactic foam panel comprises about 12% to about 18% by weight microballoons and about 82% to about 88% by weight resin matrix.

5. The system as claimed in claim 1 wherein the syntactic foam panel has an electrical conductivity of less than about $1 \times 10^{-13}$ S/m.

6. The system as claimed in claim 1 wherein the syntactic foam panel has a panel density of about 0.4 g/cc to about 1.2 g/cc.

7. The system as claimed in claim 1 wherein the syntactic foam panel comprises a substantially planar and substantially rectangular panel shape of substantially uniform thickness.

8. The system as claimed in claim 1 wherein the syntactic foam panels are dimensionally configured such that they extend beyond the bounds of the support apertures formed in the tunnel support structure.

9. The system as claimed in claim 1 wherein respective syntactic foam panels have a thickness of about 0.5 inches to about 6 inches.

10. The system as claimed in claim 1 wherein respective syntactic foam panels have a thickness of about 0.75 inches to about 2 inches.

11. The system as claimed in claim 1 further comprising a panel fastening system, wherein:
   each of the syntactic foam panels comprises a pair of opposite major faces defining a panel thickness and a plurality of mounting holes on the periphery of the syntactic foam panel and extending longitudinally across the panel thickness between the opposite major faces of the syntactic foam panel;
   the fastening system comprises a plurality of bolt assemblies;
   selected ones of the bolt assemblies comprise an anchor bolt and a compound elastomeric bushing;
   the anchor bolt comprises a head portion and a shaft portion;
   the shaft portion of the anchor bolt extends along a longitudinal dimension of the anchor bolt;
   the compound elastomeric bushing comprises an axially compressible portion and a laterally compressible portion that collectively define an interior bushing passage extending along a longitudinal dimension of the compound elastomeric bushing;
   the interior bushing passage is sized to permit passage of the shaft portion of the anchor bolt therethrough while inhibiting passage of the head portion of the anchor bolt therethrough;
   a peripheral lateral dimension of the axially compressible portion of the compound elastomeric bushing exceeds the peripheral lateral dimension of the selected mounting hole of the syntactic foam panel to inhibit passage of the axially compressible portion of the compound elastomeric bushing through the selected mounting hole;
   a peripheral lateral dimension of the laterally compressible portion of the compound elastomeric bushing is less than or substantially equal to the peripheral lateral dimension of the selected mounting hole of the syntactic foam panel to permit passage of the laterally compressible portion of the compound elastomeric bushing into the selected mounting hole; and
   a peripheral longitudinal dimension of the laterally compressible portion of the compound elastomeric bushing is at least partially disposed along the peripheral longitudinal dimension of the selected mounting hole of the syntactic foam panel.

12. The system as claimed in claim 1 wherein the signal strength attenuation contributed by individual ones of the syntactic foam panels is less than 0.5 dB at a wireless frequency between about 155 MHz and about 1300 MHz.

13. The system as claimed in claim 1 wherein the signal strength attenuation contributed by individual ones of the syntactic foam panels is less than 0.38 dB at a wireless frequency between about 155 MHz and about 1300 MHz.

14. The system as claimed in claim 1 wherein the signal strength attenuation contributed by individual ones of the syntactic foam panels is at least one order of magnitude less than that of the signal strength attenuation introduced by the surrounding the tunnel support structure to which the panel is secured at a wireless frequency between about 155 MHz and about 1300 MHz.

15. The system as claimed in claim 1 wherein the signal strength attenuation contributed by individual ones of the syntactic foam panels is less than 2.0 dB at a wireless frequency between about 900 MHz and about 2.4 GHz.

16. The system as claimed in claim 1 wherein the signal strength attenuation contributed by individual ones of the syntactic foam panels is less than 1.4 dB at a wireless frequency between about 900 MHz and about 2.4 GHz.

17. The system as claimed in claim 1 wherein the signal strength attenuation contributed by individual ones of the syntactic foam panels is at least one order of magnitude less than that of the signal strength attenuation introduced by the surrounding the tunnel support structure to which the panel is secured at a wireless frequency between about 900 MHz and about 2.4 GHz.

18. The system as claimed in claim 1 wherein:
   the subterranean system is a subterranean transportation system and the tunnel network comprises one or more railroad tracks for rail passenger transport vehicles;
   the subterranean system is a subterranean transportation system and the tunnel network comprises one or more roadways for passenger vehicles;
   the subterranean system is a mine and the tunnel network comprises a plurality of horizontally and vertically distributed tunnel network levels; or
   the subterranean system is a subterranean pedestrian network and the tunnel network comprises one or more pedestrian footpaths.

19. The system as claimed in claim 1 wherein:
   the composition and configuration of the syntactic foam panels are such that the panels degrade air circulation through the support apertures of the tunnel support structure; and
   the subterranean system further comprises a supplemental ventilation system configured to at least partially account for the degraded air circulation.

20. The system as claimed in claim 19 wherein the supplemental ventilation system comprises a plurality of ventilation zones and the tunnel network comprises a plurality of adjacent tunnels, wherein respective adjacent tunnels correspond to an individual ventilation zone of the plurality of ventilation zones.

21. The system as claimed in claim 20 wherein the syntactic foam panels comprise a fire retardant coating.

22. A method of arranging a plurality comprising syntactic foam panels within a subterranean system comprising a tunnel network and a wireless communications network; wherein
   the wireless communications network comprises a plurality of wireless transceivers positioned throughout the tunnel network;
   respective ones of the wireless transceivers are communicatively coupled to one or more wireless transceivers of the wireless communications network such that communicatively coupled transceivers of the wireless communications network lie within wireless communication range of each other;

the wireless communication range defined by communicatively coupled transceivers is a function of signal strength attenuation in a wireless signal traveling between communicatively coupled transceivers;

the tunnel network comprises tunnel support structure that contributes to the signal strength attenuation and a plurality of support apertures formed in the tunnel support structure;

the arranging the syntactic foam panels comprises securing the panels to the tunnel support structure to cover at least some of the support apertures; and the composition and configuration of the syntactic foam panels are such that the panels do not make a significant contribution to the signal strength attenuation between communicatively coupled transceivers.

23. A subterranean system comprising; a tunnel network; a plurality of syntactic foam panels; and a wireless communications network; wherein the wireless communications network comprises a wireless frequency and a plurality of wireless transceivers positioned throughout the tunnel network, respective ones of the wireless transceivers are communicatively coupled to one or more wireless transceivers of the wireless communications network such that communicatively coupled transceivers of the wireless communications network lie within wireless communication range of each other, the wireless communication range defined by communicatively coupled transceivers is a function of signal strength attenuation in a wireless signal traveling between the communicatively coupled transceivers, the tunnel network comprises tunnel support structure that contributes to the signal strength attenuation and a plurality of support apertures formed in the tunnel support structure, the syntactic foam panels are secured to the tunnel support structure to cover at least some of the support apertures, and the composition and configuration of the syntactic foam panels are such that signal strength attenuation contributed by individual ones of the syntactic foam panels is less than 0.5 dB at a wireless frequency between about 155 MHz and about 1300 MHz and less than 2.0 dB at the wireless frequency between about 900 MHz and about 2.4 GHz.

24. A subterranean system comprising; a tunnel network; a plurality of syntactic foam panels; and a wireless communications network, wherein:

the wireless communications network comprises a wireless frequency and a plurality of wireless transceivers positioned throughout the tunnel network, respective ones of the wireless transceivers are communicatively coupled to one or more wireless transceivers of the wireless communications network such that communicatively coupled transceivers of the wireless communications network lie within wireless communication range of each other, the wireless communication range defined by communicatively coupled transceivers is a function of signal strength attenuation in a wireless signal traveling between the communicatively coupled transceivers, the tunnel network comprises tunnel support structure that contributes to the signal strength attenuation and a plurality of support apertures formed in the tunnel support structure, the syntactic foam panels are secured to the tunnel support structure to cover at least some of the support apertures, and the composition and configuration of the syntactic foam panels are such that signal strength attenuation contributed by individual ones of the syntactic foam panels is at least one order of magnitude less than that of the signal strength attenuation introduced by the surrounding tunnel support structure to which the panel is secured at a wireless frequency between about 155 MHz and about 2.4 GHz.

\* \* \* \* \*

UNITED STATES PATENT AND TRADEMARK OFFICE
CERTIFICATE OF CORRECTION

PATENT NO. : 9,820,164 B1
APPLICATION NO. : 14/808572
DATED : November 14, 2017
INVENTOR(S) : Bradley M. Doudican et al.

It is certified that error appears in the above-identified patent and that said Letters Patent is hereby corrected as shown below:

In the Specification

Column 7, Lines 1-15:

"
| Property | Test Method | Criterion |
|---|---|---|
| Density | ASTM 03575 | 35 lbs./cu.ft. |
| Ultimate Compressive Strength | ASTM 0695 | 3900 psi |
| Compression elastic modulus | ASTM 0695 | 179.2 ksi |
| Ultimate Tensile strength | ASTM 0638 | 3000 psi |
| Thermal conductivity | ASTM 05930 | 0.049 BTU/hr ft F |
| Water Absorption | ASTM 0570 | <2% |
| Chemical Resistance (1 hr. exposure) | Various | Pass |
| Time to ignition | ASTM E1354-10 | > 5 sec |
| Avr. Heat release@ 180 s | ASTM E1354-10 | <360Kw/m2 |
| Heat of combustion | ASTM E1354-10 | <29 kJ/g |
| Smoke release rates | ASTM E1354-10 | < 0.245 m2/sec |
| Critical Heat Flux for Ignition | ASTM E1354-10 | 18 kW/m2 |
"

Signed and Sealed this
Twelfth Day of June, 2018

Andrei Iancu
*Director of the United States Patent and Trademark Office*

CERTIFICATE OF CORRECTION (continued)
U.S. Pat. No. 9,820,164 B1

Should read:

| Property | Test Method | Criterion |
|---|---|---|
| Density | ASTM D3575 | 35 lbs./cu.ft. |
| Ultimate Compressive Strength | ASTM D695 | 3900 psi |
| Compression elastic modulus | ASTM D695 | 179.2 ksi |
| Ultimate Tensile strength | ASTM D638 | 3000 psi |
| Thermal conductivity | ASTM D5930 | 0.049 BTU/hr ft F |
| Water Absorption | ASTM D570 | <2% |
| Chemical Resistance (1 hr. exposure) | Various | Pass |
| Time to ignition | ASTM E1354-10 | > 5 sec |
| Avr. Heat release@ 180 s | ASTM E1354-10 | <360Kw/m2 |
| Heat of combustion | ASTM E1354-10 | <29 kJ/g |
| Smoke release rates | ASTM E1354-10 | < 0.245 m2/sec |
| Critical Heat Flux for Ignition | ASTM E1354-10 | 18 kW/m2 |

-- --;

In the Claims

Column 12, Claim 14, Line 7:
"surrounding the tunnel support structure to which the panel"
Should read:
--surrounding tunnel support structure to which the panel--;

Column 12, Claim 17, Line 23:
"surrounding the tunnel support structure to which the panel"
Should read:
--surrounding tunnel support structure to which the panel--;

Column 12, Claim 22, Line 55:
"22. A method of arranging a plurality comprising syntac-"
Should read:
--22. A method of arranging a plurality of syntac- --;

Column 13, Claim 23, Line 16:
"23. A subterranean system comprising; a tunnel network;"
Should read:
--23. A subterranean system comprising: a tunnel network;--; and Column 14, Claim 24, Line 8:
"24. A subterranean system comprising; a tunnel network;"
Should read:
--24. A subterranean system comprising: a tunnel network;--.